United States Patent
Kwong et al.

(10) Patent No.: US 12,066,998 B2
(45) Date of Patent: Aug. 20, 2024

(54) ONLINE UPDATES TO SCHEMA INFORMATION IN MULTI-TENANT DATABASE SYSTEM

(71) Applicant: salesforce.com, inc., San Francisco, CA (US)

(72) Inventors: Helen Kwong, Palo Alto, CA (US); Benjamin Busjaeger, San Carlos, CA (US)

(73) Assignee: Salesforce, Inc., San Francisco, CA (US)

( * ) Notice: Subject to any disclaimer, the term of this patent is extended or adjusted under 35 U.S.C. 154(b) by 335 days.

(21) Appl. No.: 17/457,247

(22) Filed: Dec. 1, 2021

(65) Prior Publication Data

US 2023/0169067 A1 Jun. 1, 2023

(51) Int. Cl.
G06F 16/21 (2019.01)
G06F 16/23 (2019.01)
G06F 16/25 (2019.01)

(52) U.S. Cl.
CPC ........ G06F 16/2379 (2019.01); G06F 16/211 (2019.01); G06F 16/2358 (2019.01); G06F 16/256 (2019.01)

(58) Field of Classification Search
None
See application file for complete search history.

(56) References Cited

U.S. PATENT DOCUMENTS

| | | | |
|---|---|---|---|
| 10,474,562 B2 | 11/2019 | Donaldson et al. | |
| 10,608,961 B2 | 3/2020 | Kwong et al. | |
| 2017/0177625 A1* | 6/2017 | Lam | G06F 16/213 |
| 2018/0096012 A1* | 4/2018 | Warshavsky | G06F 16/2282 |
| 2018/0210712 A1 | 7/2018 | Busjaeger | |
| 2018/0210713 A1 | 7/2018 | Busjaeger | |
| 2019/0205459 A1 | 7/2019 | Busjaeger et al. | |
| 2019/0220917 A1 | 7/2019 | Busjaeger et al. | |
| 2020/0073972 A1 | 3/2020 | Busjaeger et al. | |

(Continued)

FOREIGN PATENT DOCUMENTS

WO 2020242740 12/2020

OTHER PUBLICATIONS

Hillis, Samir A., "An Efficient Approach for Supporting Multi-Tenancy Schema Inheritance in RDBMS for SaaS", Thesis, Islamic University of Gaza (2015), 65 pages. (Year: 2015).*

*Primary Examiner* — Scott A. Waldron
(74) *Attorney, Agent, or Firm* — Kowert, Hood, Munyon, Rankin & Goetzel, P.C.; Michael B. Davis; Dean M. Munyon (57) ABSTRACT

Techniques are disclosed relating to updating schema information for multi-tenant databases. In some embodiments, a multi-tenant database system stores a standard schema for a database object, where the standard schema is shared by multiple tenants and a tenant-specific schema for the database object. The tenant-specific schema may include one or more tenant-specific custom elements for the database object. The system may enforce a naming scheme in which tenant-specific elements include a predetermined pattern that is not included in object elements of the standard schema. The system may, in response to detecting an update of the standard schema, automatically propagate the update to the tenant schema, while the tenant is online.

20 Claims, 5 Drawing Sheets

(56) References Cited

U.S. PATENT DOCUMENTS

| | | |
|---|---|---|
| 2020/0097893 A1 | 3/2020 | Acharya et al. |
| 2020/0250172 A1 | 8/2020 | Busjaeger et al. |
| 2020/0250210 A1 | 8/2020 | Busjaeger et al. |
| 2021/0099301 A1 | 4/2021 | Busjaeger et al. |
| 2022/0342718 A1* | 10/2022 | Iqbal ...................... H04L 67/63 |

* cited by examiner

ONLINE UPDATES TO SCHEMA INFORMATION IN MULTI-TENANT DATABASE SYSTEM

BACKGROUND

Technical Field

This disclosure relates generally to computer databases and more particularly to updating schema documents in a multi-tenant context.

Description of the Related Art

In the multi-tenant database context, metadata documents may be used to define the schema for different database domains, particularly in non-relational database implementations. In particular, a database provider may provide a shared schema with standard definitions of database objects. Individual tenants may also customize the database objects (e.g., by adding fields, indices, etc.) or defining their own custom objects. Traditionally, updates to the shared schema for a domain would require manual updates to tenant-specific metadata documents in that domain. This might cause undesirable down-time for the database service, for example.

DETAILED DESCRIPTION

In some embodiments, an underlying data store for a database system is non-relational (e.g., a NoSQL storage that uses key/value pairs, JSON documents, or edge/vertex graphs for storage of database tables). This is in contrast to traditional relational database techniques that use a tabular scheme of rows and columns to store database tables. Non-relational storage may provide performance and high scalability but may not provide guarantees about when updates are available to others. Therefore, updating schema information in the multi-tenant context may be challenging.

For example, a database service provider may define schema information (and potentially other related metadata) for standard objects (e.g., database tables) that are shared by multiple tenants. These objects may be defined according to a top-level scope. Each tenant may also customize their schemas, e.g., by adding custom objects, adding fields or indices to an existing object, etc.

In this context, when the standard definitions are modified, traditionally the system may go offline to update and reconcile tenant-specific metadata documents with the updated standard definitions while avoiding conflicts with the custom tenant definitions. In this context, tenants might start with an empty metadata document and add custom definitions to their metadata document, while pulling standard definitions from the top-level metadata document. Further, a database system provider might need to keep track of all tenants and iterate through their metadata documents when updating standard definitions to avoid naming collisions.

In disclosed embodiments, the database system defines different scopes for schema data, including an example tenant view namespace scope that the system is configured to update online. This scope may automatically inherit schema information from a top-level scope and pre-determined patterns may be used to ensure that conflicts do not occur with custom tenant metadata names. As discussed in detail below, defining these scopes and a programming model for automatic online updates may advantageously allow tenant customization without requiring downtime for updates to standard definitions.

Example Scopes and Automatic Propagation of Standard Schema Information

Figure 1:
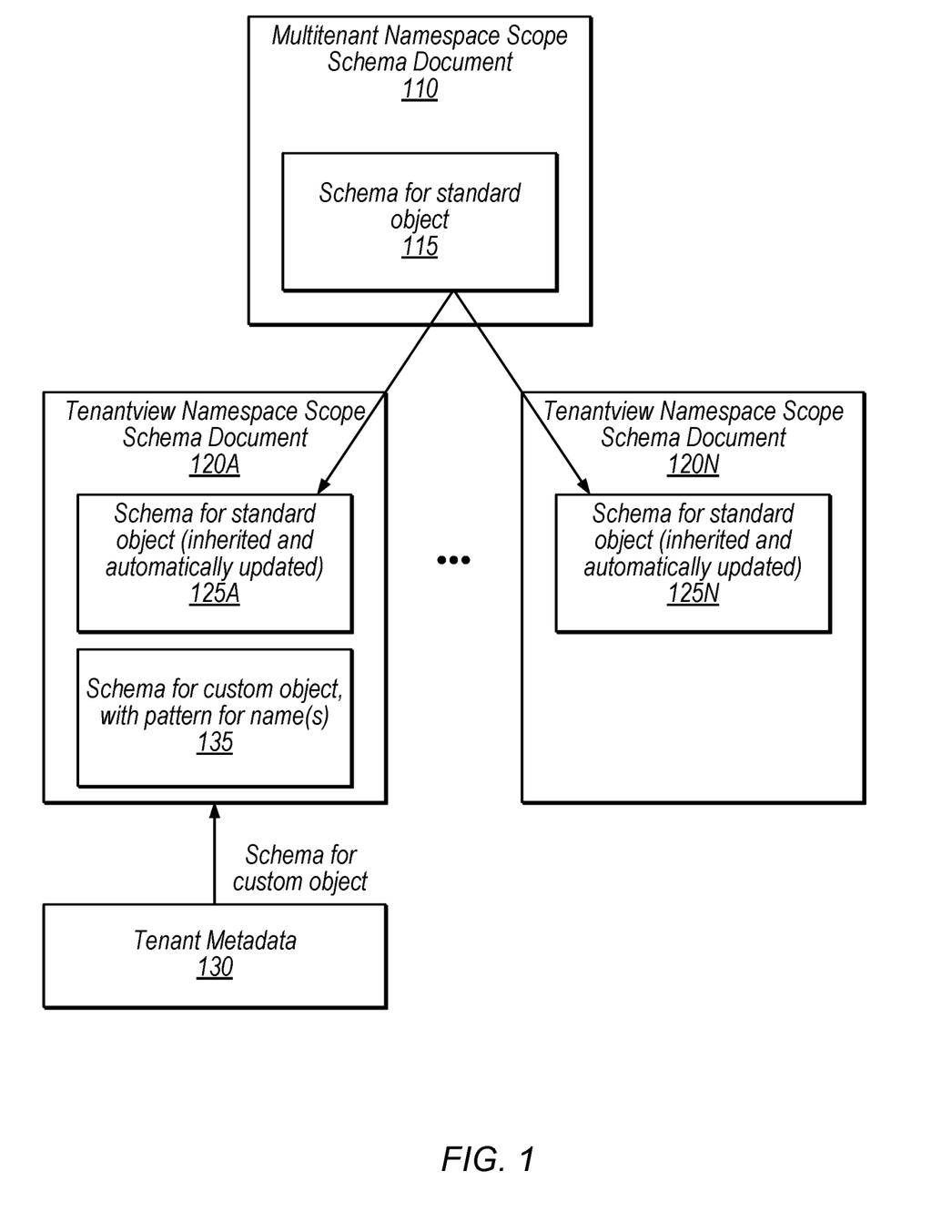
FIG. 1 is a block diagram illustrating example multitenant and tenant view namespace scopes for schema documents, according to some embodiments.

FIG. 1 is a block diagram illustrating documents for example scopes, according to some embodiments. In the illustrated example, the system implements a multitenant namespace scope (whose schema is indicated by document 110) and multiple tenant view namespace scopes (whose schemas are respectively indicated by documents 120A-120N). Document 110 is shared by multiple tenants while documents 120 are tenant-specific.

As shown, schema document 110 has multitenant scope and defines a schema for a standard object 115 (e.g., a database table) that is shared by multiple tenants. In some embodiments, the system is configured to, in response to an update to document 110, automatically update documents 120 with the changes. As shown, documents 120 inherit the schema information for standard objects from document 110 (shown as schema elements 125A-125N) and are automatically updated.

In the illustrated embodiment, tenant metadata 130 provides a schema for a custom object. This custom object may be a new object defined by the tenant or an update to a standard object (e.g., a new field or index). As shown, the schema for this custom object is reflected as portion 135 of document 120A.

In some embodiments, documents 120 use a pattern or string for each custom element to indicate that it is a tenant-defined custom element. The system may ensure that this pattern is not used for names in document 110. This may avoid naming collisions with document 110, thereby facilitating online updates. As used herein, the term "online," in the context of a database tenant, refers to a situation where the database remains available to accept tenant queries. When the system remains online during a schema update, in-flight transactions may or may not receive responses based on the updated schema (e.g., some responses may use the old schema for a given database object while some responses may use the new schema). An online situation is in contrast to an offline update, wherein the database is not available for tenant queries, e.g., during a scheduled downtime.

In some embodiments, tenants authenticate using credentials that are associated with a tenant view scope and are therefore authenticated to that scope (while users associated with the database service provider may be able to authenticate to the top-level scope and change the standard schema).

Figure 2:
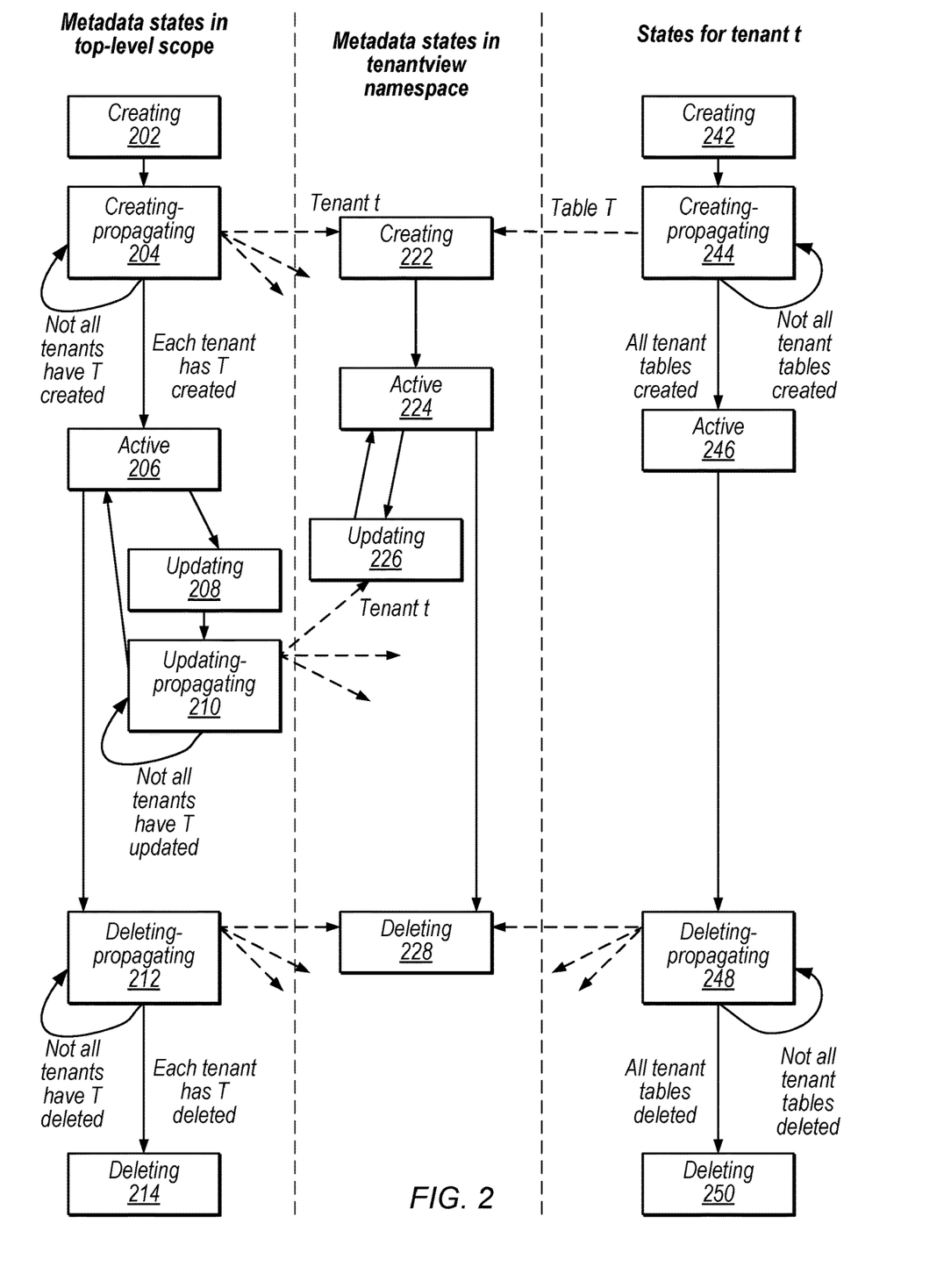
FIG. 2 is a state diagram illustrating example states for schema information in different scopes and propagation of schema updates, according to some embodiments.

FIG. 2 is a state diagram illustrating example online update techniques, according to some embodiments. In the illustrated embodiment, states are shown for an example multitenant table T and tenant t. As shown, states 202-214 are for the top-level scope (e.g., corresponding to document 110), states 222-228 are for the tenant view scope (e.g., corresponding to a document 120), and states 242-250 are for the tenant. The system may maintain state information at one or more granularities for various database elements (e.g., scope, database objects, etc.) to facilitate proper transitions between states. In the examples discussed below, state is maintained at the granularity of the schema for a database object.

In various embodiments, the system uses the schema information defined by the metadata documents to properly perform data access requests according to the schema.

In some embodiments, the database system supports multiple APIs. For example, the system may support a data API for accessing data according to various schemas discussed herein, a metadata API (e.g., for specifying those schemas), and a provisioning API for creating scopes within a given domain (which may include configuring a scope's multitenancy parameters).

For a table T created at the top-level, the creating state 202 may include provisioning a top-level scope (if not already provisioned) and writing the schema for the table T to the metadata document for the top-level scope. The creating-propagating state 204 propagates the change to all tenants in the top-level scope, after which the state changes to active state 206 once all tenants have created the schema for table T.

Creating state 222 for tenant t creates the schema for the table, e.g., by copying schema information from the metadata document for the table from the top-level scope to the metadata document for the tenant view namespace. (The system may also provision the tenant view metadata document if it has not yet been created) Once the table schema is created, it becomes active in that namespace.

Creating state 242 may correspond to provisioning a new tenant, which may involve creation of a metadata document for the tenant view namespace. Creating-propagating state 244 may incorporate any custom schema information from tenant t (e.g., custom fields for table T) until all tenant tables have been created (including updates to standard tables). At that point, the tenant transitions to active state 246.

Creating states 202 and 242 may be initiated based on commands received using the provisioning API, in some embodiments. Changes between other illustrated states may be triggered based on received commands using the metadata API. The data API may be used to actually access tables created according to the schema (e.g., for an object type that specifies a "product" and "cost" fields, the data API may be used to create an instance of the object and store values for these fields, e.g., a "t-shirt" product and a price of $20).

As discussed above, after custom schema information has already been incorporated into the tenant view metadata document, one or more standard objects may be changed at the top-level scope. In this scenario, the object schema changes to the updating state 208 then the updating-propagating state 210 in which the changes are propagated to the various tenants. Those tenants' object schemas then transfer from active state 224 to updating state 226 until they are updated. Once all the tenant view namespaces have been updated, to top-level object schema changes back to the active state 206. In some embodiments, the state transitions are automatic in response to updating of the top-level metadata file and are performed while the tenants remain online, which may advantageously reduce database downtime and cumbersome per-tenant updates. Further, explicitly defining shared standard schema information at an upper-level scope may allow queries across tenants using the standard schema.

As shown deleting-propagating states 212 and 248 and deleting states 228, 214, and 250 may be used to delete database objects. In some embodiments, one or more tombstone states (not shown) are used to track status of objects after deletion.

Example Change Stream Processing to Detect Schema Updates

In some embodiments, the database system processes a change stream to detect changes to the standard schema and automatically propagate updates to tenant view scopes. This may be performed by a stream processor, which may asynchronously process the change stream (relative to changes occurring).

A change stream, in embodiments, stores change stream records that are accessible to a computer system. In some embodiments, multiple different change streams provide change records to the computer system. For example, multiple database tables may generate change information for multiple different change streams and a computer system may process the multiple different change streams. In some embodiments, a change stream includes information that specifies a sequence of changes made to a database object or to a schema document. In some embodiments, each change record has a corresponding sequence number, which may be unique across the change stream. In some embodiments, change records indicate the state of data both before and after a given change. A change stream may be provided by various database services, which may also provide polling mechanisms to retrieve changes from the change stream as they are generated. In some embodiments, a change stream is sharded and different processes handle different sets of change stream shards (the different sets may or may not overlap). In some embodiments, change stream shards are scaled based on changes made for one or more tenants or types of changes to be handled for a given change stream record. For example, a web process may receive a high load of external requests from a given tenant and may increase the size of a change stream shard for that tenant or may split the change stream shard into multiple shards based on the requests.

As discussed in U.S. patent application Ser. No. 16/428,562 filed on May 31, 2019 (now issued as U.S. Pat. No. 11,126,625), a polling module may send a domain name server (DNS) address for a stream process and a combined checkpoint for a change stream to a database translator module. As change stream records are successfully processed, a stream process may update the combined checkpoint and store the combined checkpoint in a lease table. In some embodiments, the polling module retrieves the combined checkpoint from a database module (e.g., via a database translator module) when the server system hosting the stream process recovers from a crash. For example, based on a sequence number indicated by the retrieved checkpoint, the polling module may begin processing change stream records after the location indicated by that sequence number. The DNS address may be accessed and used by other processes, e.g., to forward position indicators to the stream process.

In some embodiments, the polling module polls for change stream records using delta links, where the delta links are position indicators with sequence numbers for one or more change stream shards. In some embodiments, the polling module sends an initial query to the change stream requesting sequence numbers for one or more shards. For each successive query, an updated position indicator is returned, with new sequence numbers for each change stream shard with new records.

Such a polling module is one example of a technique to detect changes to the standard schema. In some embodiments, detection of such a change in a change record triggers a change in state (e.g., from active state 206 to updating state 208) for a changed database object. This may facilitate automatic propagation of updates to the standard schema.

Example Updates to Standard Schema and Tenant Customization

Referring now to Appendices A-L, the JSON listings in these appendices provide specific examples of various operations discussed above. Speaking generally, Appendices A-C show scope creation and configuration, Appendices D-G show adding a standard object type (e.g., a table schema), Appendices H-I show adding a custom property to the object for a tenant, and Appendices J-L show automatically propagating an update to the standard object type after custom properties have already been defined. In some embodiments, the various operations covered in the Appendices are performed online, without interrupting the database service available to tenants.

In appendix A, a request is submitted to a top-level scope (e.g., a cloud or service scope in the Salesforce context). In this example, the name of the new scope to be created is "core" and the multitenancy element starting at line 4 configures multitenancy for the scope. In particular, it provides names for the multitenant namespace and tenant view namespace as part of the multitenancy configuration for the space. Further, the TenantMetadataNameQualifier on line 7 is an example pattern (two underscore symbols in this example) to be used for custom elements to avoid collisions. In some embodiments, this pattern must not appear in top-level schema identifiers to avoid naming conflicts. In this example, the response indicates that the scope has a CREATING status on line 4 and provides an id on line 3.

According to Appendix B, the system waits until top-level scope creating finishes and the response is received with an ACTIVE status at line 4. At this point, the scope is active. According to appendix C, the system reads the top-level scope's initial metadata document version. At this point, the scope does not have any schema objects.

According to Appendix D, the system updates the top-level scope's metadata document (e.g., based on a request from a development team of the database provider). In particular, the requests creates an object type (which may also be referred to as an entity type) called "Product" (see lines 6-44). This product objection could correspond to the table T discussed with reference to FIG. 2, for example. In this example, certain fields like "Status" and "LastModifiedTime" are omitted because they are computed by the system. In the illustrated example, the product object includes a name field as the key and multiple properties (name, type, and price). In this example, the product object also includes an index with the type and price as keys (see lines 29-39). The response indicates that the table is in the UPDATING state. Once the update is finished, the table eventually becomes ACTIVE, e.g., as shown in the response in Appendix E, which shows a procedure for waiting until the top-level scope metadata document update is finished.

Appendix F shows retrieval of the top-level scope metadata document (the first request), creation of the tenant scope (second request), and waiting for the tenant scope creation to finish and become ACTIVE (third request).

Appendix G shows retrieval of the tenant scope metadata document. As shown, this document inherits the standard definition of the product object and reflects its ACTIVE status.

Appendix H shows an update to the tenant scope metadata document. In particular, the update adds a custom property to the product object. In this example, the property CreatedTime_c is of the type DateTimeOffset and may indicate the time at which a given product instance was created. Note that the property includes the "_" pattern to indicate that it is a custom tenant property. This is one example of a pattern for tenant-scope updates to avoid conflicts with multi-tenant scope standard objects. The response in Appendix H reflects the new custom property.

Appendix I shows waiting for the tenant scope metadata update to finish. Once the update has finished, the tenant scope reflects the CreatedTime_c field and the object once again has an ACTIVE status. Note that this update does not affect the metadata document for the top-level scope, because the tenant customization is at the tenant scope.

Appendix J shows another update to the top-level scope metadata document. Note that at this point, the pattern for tenant customizations may facilitate avoiding naming collisions. The illustrated update adds object types Order and LineItem (and there is a relationship where an Order object may include multiple LineItem objects, which may be reflected in NavigationProperties). As shown, in the response, the product object is in the UPDATING state and the other two objects Order and LineItem are in the CREATING state until they become active.

Appendix K shows waiting until the top-level update requested in Appendix J is finished.

Appendix L shows an updated tenant scope metadata document that has been automatically updated to reflect the changes to the standard schema that were requested in Appendix J. As shown, the tenant view metadata document has been updated to include the Order and LineItem object types. Further, the objects are now in the active state. As discussed above, the updates reflected in Appendices J-L may be performed in an online fashion and tenants may continue to access the database during the updates. Subsequent accesses to the tenant scope metadata will reflect the changes to the standard schema.

Example Method

Figure 3:
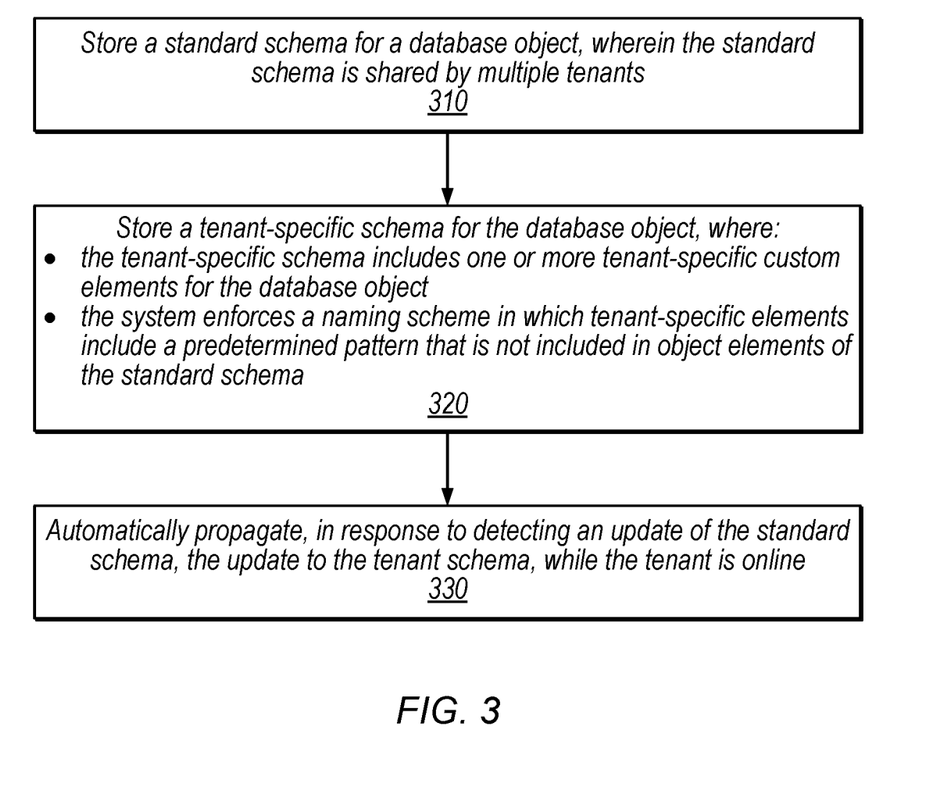
FIG. 3 is a flow diagram illustrating an example method, according to some embodiments.

FIG. 3 is a flow diagram illustrating an example method for automatically propagating updates to a standard schema, according to some embodiments. The method shown in FIG. 3 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 310, in the illustrated embodiment, a database system stores a standard schema for a database object, where the standard schema is shared by multiple tenants.

At 320, in the illustrated embodiment, the database system stores a tenant-specific schema for the database object, where the tenant-specific schema includes one or more tenant-specific custom elements for the database object and the system enforces a naming scheme in which tenant-specific elements include a predetermined pattern (e.g., a string) that is not included in object elements of the standard schema. Note that the system may store, for different tenants, multiple different tenant-specific schemas associated with the standard schema.

In some embodiments, the system stores data for a tenant according to both the standard schema and the tenant-specific schema for the database object in a non-relational underlying storage format. In some embodiments, the standard schema is stored using a top-level scope and the tenant-specific schema is stored in a tenant namespace scope.

At 330, in the illustrated embodiment, the database system, in response to detecting an update of the standard schema, automatically propagates the update to the tenant schema, while the tenant is online. In some embodiments, the system asynchronously processes change records from a change stream for the non-relational underlying storage format. In these embodiments, the detection of the update of the standard schema and automatic propagation may be based on a change record for the update in the change stream.

In some embodiments, the system creates the tenant namespace scope and the top-level scope. The system may also configuring multitenancy settings for the top-level scope based on one or more commands received via a provisioning application programming interface (API), update the tenant-specific schema based on one or more commands received via a metadata API, and update a database object that conforms with the tenant-specific schema based on one or more commands received via a data API.

In some embodiments, the system maintains state information for the standard schema that supports at least the following states: a creating state, an active state, an updating state, and one or more states in which at least a portion of the standard schema is being propagated to multiple tenants. In some embodiments, the system maintains state information for the tenant-specific schema that supports at least the following states: a creating state, an active state, and an updating state.

In some embodiments, in response to creation of a tenant-defined database object, the system automatically stores a tenant-specific schema for the tenant-defined database object. This may not update the standard schema, however. The system may enforce the naming scheme with a pattern for the tenant-defined database object, e.g., by signaling an error if the pattern is not detected or automatically adding the pattern.

Example Multi-Tenant Database System

Figure 4:
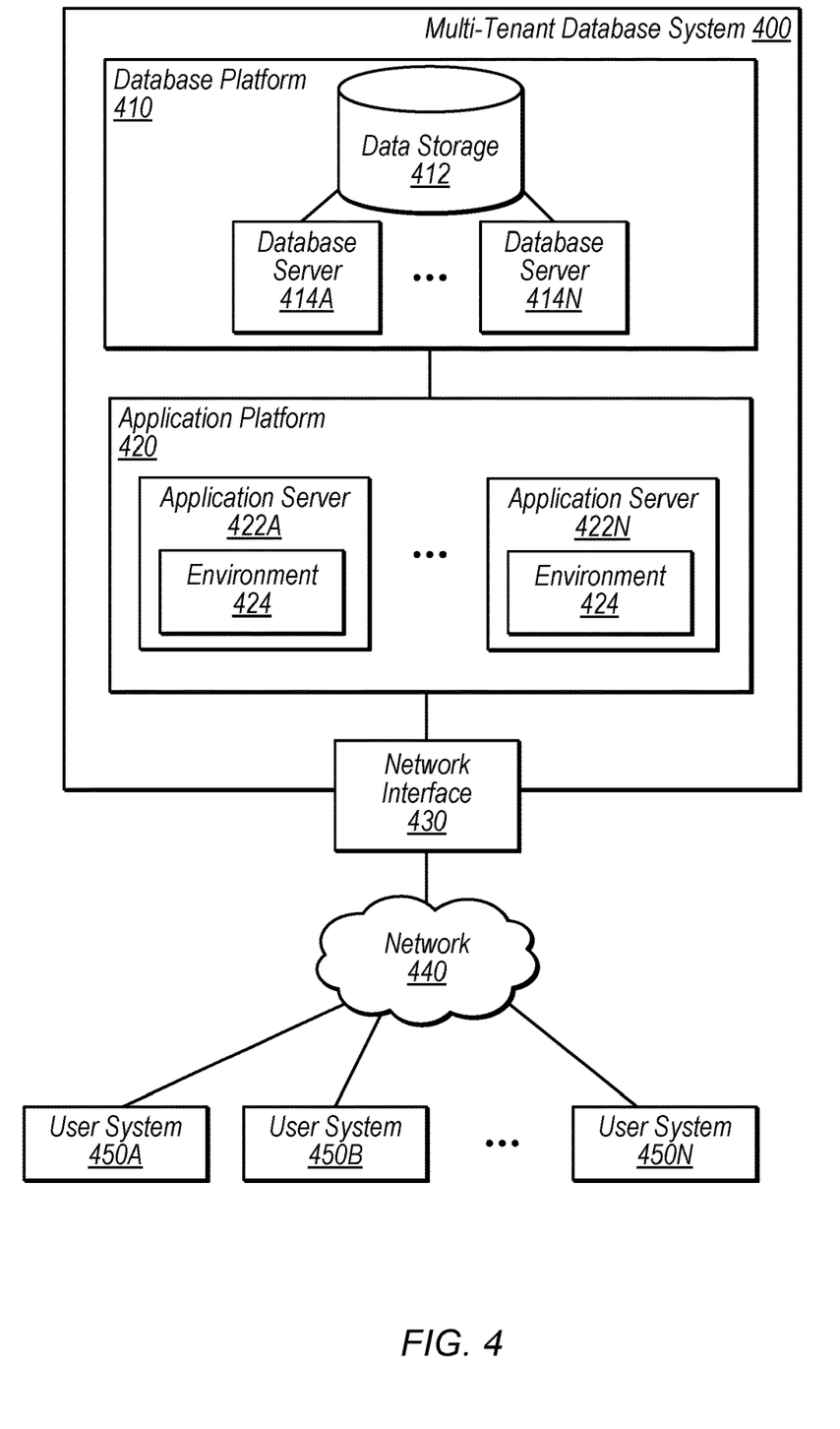
FIG. 4 is a block diagram illustrating an example multi-tenant database system, according to some embodiments.

Turning now to FIG. 4, an exemplary multi-tenant database system (MTS) 400 in which various techniques of the present disclosure can be implemented is shown—e.g., MTS 400 may implement the scopes of FIG. 1 and the state machine of FIG. 2. In FIG. 4, MTS 400 includes a database platform 410, an application platform 420, and a network interface 430 connected to a network 440. Also as shown, database platform 410 includes a data storage 412 and a set of database servers 414A-N that interact with data storage 412. and application platform 420 includes a set of application servers 422A-N having respective environments 424. In the illustrated embodiment, MTS 400 is connected to various user systems 450A-N through network 440. The disclosed multi-tenant system is included for illustrative purposes and is not intended to limit the scope of the present disclosure. In other embodiments, techniques of this disclosure are implemented in non-multi-tenant environments such as client/server environments, cloud computing environments, clustered computers, etc.

MTS 400, in various embodiments, is a set of computer systems that together provide various services to users (alternatively referred to as "tenants") that interact with MTS 400. In some embodiments, MTS 400 implements a customer relationship management (CRM) system that provides mechanism for tenants (e.g., companies, government bodies, etc.) to manage their relationships and interactions with customers and potential customers. For example, MTS 400 might enable tenants to store customer contact information (e.g., a customer's website, email address, telephone number, and social media data), identify sales opportunities, record service issues, and manage marketing campaigns. Furthermore, MTS 400 may enable those tenants to identify how customers have been communicated with, what the customers have bought, when the customers last purchased items, and what the customers paid. To provide the services of a CRM system and/or other services, as shown, MTS 400 includes a database platform 410 and an application platform 420.

Database platform 410, in various embodiments, is a combination of hardware elements and software routines that implement database services for storing and managing data of MTS 400, including tenant data. As shown, database platform 410 includes data storage 412. Data storage 412, in various embodiments, includes a set of storage devices (e.g., solid state drives, hard disk drives, etc.) that are connected together on a network (e.g., a storage attached network (SAN)) and configured to redundantly store data to prevent data loss. In various embodiments, data storage 412 is used to implement a database comprising a collection of information that is organized in a way that allows for access, storage, and manipulation of the information. Data storage 412 may implement a single database, a distributed database, a collection of distributed databases, a database with redundant online or offline backups or other redundancies, etc. As part of implementing the database, data storage 412 may store files that include one or more database records having respective data payloads (e.g., values for fields of a database table) and metadata (e.g., a key value, timestamp, table identifier of the table associated with the record, tenant identifier of the tenant associated with the record, etc.).

In various embodiments, a database record may correspond to a row of a table. A table generally contains one or more data categories that are logically arranged as columns or fields in a viewable schema. Accordingly, each record of a table may contain an instance of data for each category defined by the fields. For example, a database may include a table that describes a customer with fields for basic contact information such as name, address, phone number, fax number, etc. A record therefore for that table may include a value for each of the fields (e.g., a name for the name field) in the table. Another table might describe a purchase order, including fields for information such as customer, product, sale price, date, etc. In various embodiments, standard entity tables are provided for use by all tenants, such as tables for account, contact, lead and opportunity data, each containing pre-defined fields. MTS 400 may store, in the same table, database records for one or more tenants—that is, tenants may share a table. Accordingly, database records, in various embodiments, include a tenant identifier that indicates the owner of a database record. As a result, the data of one tenant is kept secure and separate from that of other tenants so that that one tenant does not have access to another tenant's data, unless such data is expressly shared.

In some embodiments, the data stored at data storage 412 is organized as part of a log-structured merge-tree (LSM tree). An LSM tree normally includes two high-level components: an in-memory buffer and a persistent storage. In operation, a database server 414 may initially write database records into a local in-memory buffer before later flushing those records to the persistent storage (e.g., data storage 412). As part of flushing database records, the database server 414 may write the database records into new files that are included in a "top" level of the LSM tree. Over time, the database records may be rewritten by database servers 414 into new files included in lower levels as the database records are moved down the levels of the LSM tree. In various implementations, as database records age and are moved down the LSM tree, they are moved to slower and slower storage devices (e.g., from a solid state drive to a hard disk drive) of data storage 412.

When a database server 414 wishes to access a database record for a particular key, the database server 414 may traverse the different levels of the LSM tree for files that potentially include a database record for that particular key. If the database server 414 determines that a file may include a relevant database record, the database server 414 may fetch the file from data storage 412 into a memory of the database server 414. The database server 414 may then check the fetched file for a database record having the particular key. In various embodiments, database records are immutable once written to data storage 412. Accordingly, if the database server 414 wishes to modify the value of a row of a table (which may be identified from the accessed database record), the database server 414 writes out a new database record to the top level of the LSM tree. Over time, that database record is merged down the levels of the LSM tree. Accordingly, the LSM tree may store various database records for a database key where the older database records for that key are located in lower levels of the LSM tree then newer database records.

Database servers 414, in various embodiments, are hardware elements, software routines, or a combination thereof capable of providing database services, such as data storage, data retrieval, and/or data manipulation. Such database services may be provided by database servers 414 to components (e.g., application servers 422) within MTS 400 and to components external to MTS 400. As an example, a database server 414 may receive a database transaction request from an application server 422 that is requesting data to be written to or read from data storage 412. The database transaction request may specify an SQL SELECT command to select one or more rows from one or more database tables. The contents of a row may be defined in a database record and thus database server 414 may locate and return one or more database records that correspond to the selected one or more table rows. In various cases, the database transaction request may instruct database server 414 to write one or more database records for the LSM tree-database servers 414 maintain the LSM tree implemented on database platform 410. In some embodiments, database servers 414 implement a relational database management system (RDMS) or object oriented database management system (OODBMS) that facilitates storage and retrieval of information against data storage 412. In various cases, database servers 414 may communicate with each other to facilitate the processing of transactions. For example, database server 414A may communicate with database server 414N to determine if database server 414N has written a database record into its in-memory buffer for a particular key.

Application platform 420, in various embodiments, is a combination of hardware elements and software routines that implement and execute CRM software applications as well as provide related data, code, forms, web pages and other information to and from user systems 450 and store related data, objects, web page content, and other tenant information via database platform 410. In order to facilitate these services, in various embodiments, application platform 420 communicates with database platform 410 to store, access, and manipulate data. In some instances, application platform 420 may communicate with database platform 410 via different network connections. For example, one application server 422 may be coupled via a local area network and another application server 422 may be coupled via a direct network link. Transfer Control Protocol and Internet Protocol (TCP/IP) are exemplary protocols for communicating between application platform 420 and database platform 410, however, it will be apparent to those skilled in the art that other transport protocols may be used depending on the network interconnect used.

Application servers 422, in various embodiments, are hardware elements, software routines, or a combination thereof capable of providing services of application platform 420, including processing requests received from tenants of MTS 400. Application servers 422, in various embodiments, can spawn environments 424 that are usable for various purposes, such as providing functionality for developers to develop, execute, and manage applications (e.g., business logic). Data may be transferred into an environment 424 from another environment 424 and/or from database platform 410. In some cases, environments 424 cannot access data from other environments 424 unless such data is expressly shared. In some embodiments, multiple environments 424 can be associated with a single tenant.

Application platform 420 may provide user systems 450 access to multiple, different hosted (standard and/or custom) applications, including a CRM application and/or applications developed by tenants. In various embodiments, application platform 420 may manage creation of the applications, testing of the applications, storage of the applications into database objects at data storage 412, execution of the applications in an environment 424 (e.g., a virtual machine of a process space), or any combination thereof. In some embodiments, application platform 420 may add and remove application servers 422 from a server pool at any time for any reason, there may be no server affinity for a user and/or organization to a specific application server 422. In some embodiments, an interface system (not shown) implementing a load balancing function (e.g., an F5 Big-IP load balancer) is located between the application servers 422 and the user systems 450 and is configured to distribute requests to the application servers 422. In some embodiments, the load balancer uses a least connections algorithm to route user requests to the application servers 422. Other examples of load balancing algorithms, such as are round robin and observed response time, also can be used. For example, in certain embodiments, three consecutive requests from the same user could hit three different servers 422, and three requests from different users could hit the same server 422.

In some embodiments, MTS 400 provides security mechanisms, such as encryption, to keep each tenant's data separate unless the data is shared. If more than one server 414 or 422 is used, they may be located in close proximity to one another (e.g., in a server farm located in a single building or campus), or they may be distributed at locations remote from one another (e.g., one or more servers 414 located in city A and one or more servers 422 located in city B). Accordingly, MTS 400 may include one or more logically and/or physically connected servers distributed locally or across one or more geographic locations.

One or more users (e.g., via user systems 450) may interact with MTS 400 via network 440. User system 450 may correspond to, for example, a tenant of MTS 400, a provider (e.g., an administrator) of MTS 400, or a third party. Each user system 450 may be a desktop personal computer, workstation, laptop, PDA, cell phone, or any Wireless Access Protocol (WAP) enabled device or any other computing device capable of interfacing directly or indirectly to the Internet or other network connection. User system 450 may include dedicated hardware configured to interface with MTS 400 over network 440. User system 450 may execute a graphical user interface (GUI) corresponding to MTS 400, an HTTP client (e.g., a browsing program, such as Microsoft's Internet Explorer™ browser, Netscape's Navigator™ browser, Opera's browser, or a WAP-enabled browser in the case of a cell phone, PDA or other wireless device, or the like), or both, allowing a user (e.g., subscriber of a CRM system) of user system 450 to access, process, and view information and pages available to it from MTS 400 over network 440. Each user system 450 may include one or more user interface devices, such as a keyboard, a mouse, touch screen, pen or the like, for interacting with a graphical user interface (GUI) provided by the browser on a display monitor screen, LCD display, etc. in conjunction with pages, forms and other information provided by MTS 400 or other systems or servers. As discussed above, disclosed embodiments are suitable for use with the Internet, which refers to a specific global internetwork of networks. It should be understood, however, that other networks may be used instead of the Internet, such as an intranet, an extranet, a virtual private network (VPN), a non-TCP/IP based network, any LAN or WAN or the like.

Because the users of user systems 450 may be users in differing capacities, the capacity of a particular user system 450 might be determined one or more permission levels associated with the current user. For example, when a salesperson is using a particular user system 450 to interact with MTS 400, that user system 450 may have capacities (e.g., user privileges) allotted to that salesperson. But when an administrator is using the same user system 450 to interact with MTS 400, the user system 450 may have capacities (e.g., administrative privileges) allotted to that administrator. In systems with a hierarchical role model, users at one permission level may have access to applications, data, and database information accessible by a lower permission level user, but may not have access to certain applications, database information, and data accessible by a user at a higher permission level. Thus, different users may have different capabilities with regard to accessing and modifying application and database information, depending on a user's security or permission level. There may also be some data structures managed by MTS 400 that are allocated at the tenant level while other data structures are managed at the user level.

In some embodiments, a user system 450 and its components are configurable using applications, such as a browser, that include computer code executable on one or more processing elements. Similarly, in some embodiments, MTS 400 (and additional instances of MTSs, where more than one is present) and their components are operator configurable using application(s) that include computer code executable on processing elements. Thus, various operations described herein may be performed by executing program instructions stored on a non-transitory computer-readable medium and executed by processing elements. The program instructions may be stored on a non-volatile medium such as a hard disk, or may be stored in any other volatile or non-volatile memory medium or device as is well known, such as a ROM or RAM, or provided on any media capable of staring program code, such as a compact disk (CD) medium, digital versatile disk (DVD) medium, a floppy disk, and the like.

Additionally, the entire program code, or portions thereof, may be transmitted and downloaded from a software source, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing aspects of the disclosed embodiments can be implemented in any programming language that can be executed on a server or server system such as, for example, in C, C+, HTML, Java, JavaScript, or any other scripting language, such as VBScript.

Network 440 may be a LAN (local area network), WAN (wide area network), wireless network, point-to-point network, star network, token ring network, hub network, or any other appropriate configuration. The global internetwork of networks, often referred to as the "Internet" with a capital "I," is one example of a TCP/IP (Transfer Control Protocol and Internet Protocol) network. It should be understood, however, that the disclosed embodiments may utilize any of various other types of networks.

User systems 450 may communicate with MTS 400 using TCP/IP and, at a higher network level, use other common Internet protocols to communicate, such as HTTP, FTP, AFS, WAP, etc. For example, where HTTP is used, user system 450 might include an HTTP client commonly referred to as a "browser" for sending and receiving HTTP messages from an HTTP server at MTS 400. Such a server might be implemented as the sole network interface between MTS 400 and network 440, but other techniques might be used as well or instead. In some implementations, the interface between MTS 400 and network 440 includes load sharing functionality, such as round-robin HTTP request distributors to balance loads and distribute incoming HTTP requests evenly over a plurality of servers.

In various embodiments, user systems 450 communicate with application servers 422 to request and update system-level and tenant-level data from MTS 400 that may require one or more queries to data storage 412. In some embodiments, MTS 400 automatically generates one or more SQL statements (the SQL query) designed to access the desired information. In some cases, user systems 450 may generate requests having a specific format corresponding to at least a portion of MTS 400. As an example, user systems 450 may request to move data objects into a particular environment 424 using an object notation that describes an object relationship mapping (e.g., a JavaScript object notation mapping) of the specified plurality of objects.

Example Computer System

Figure 5:
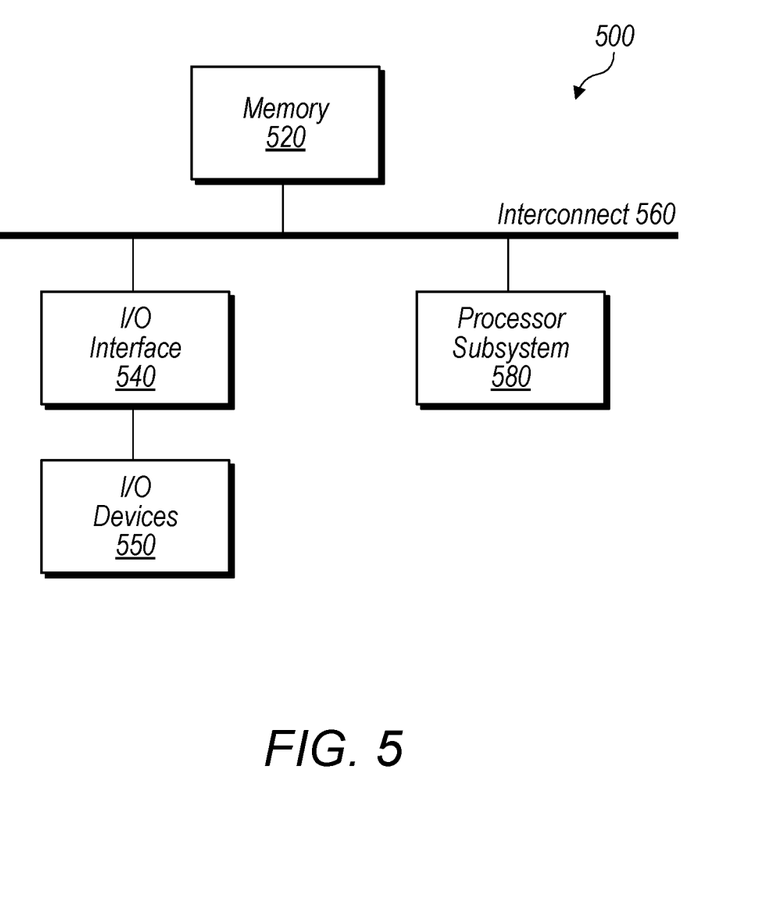
FIG. 5 is a block diagram illustrating an example computing device, according to some embodiments.

Turning now to FIG. 5, a block diagram of an exemplary computer system 500, which may implement an MTS 400 a user system 450, or both, is depicted. Computer system 500 includes a processor subsystem 580 that is coupled to a system memory 520 and I/O interfaces(s) 540 via an interconnect 560 (e.g., a system bus). I/O interface(s) 540 is coupled to one or more I/O devices 550. Although a single computer system 500 is shown in FIG. 5 for convenience, system 500 may also be implemented as two or more computer systems operating together.

Processor subsystem 580 may include one or more processors or processing units. In various embodiments of computer system 500, multiple instances of processor subsystem 580 may be coupled to interconnect 560. In various embodiments, processor subsystem 580 (or each processor unit within 580) may contain a cache or other form of on-board memory.

System memory 520 is usable store program instructions executable by processor subsystem 580 to cause system 500 perform various operations described herein. System memory 520 may be implemented using different physical memory media, such as hard disk storage, floppy disk storage, removable disk storage, flash memory, random access memory (RAM-SRAM, EDO RAM, SDRAM, DDR SDRAM, RAMBUS RAM, etc.), read only memory (PROM, EEPROM, etc.), and so on. Memory in computer system 500 is not limited to primary storage such as memory 520. Rather, computer system 500 may also include other forms of storage such as cache memory in processor subsystem 580 and secondary storage on I/O Devices 550 (e.g., a hard drive, storage array, etc.). In some embodiments, these other forms of storage may also store program instructions executable by processor subsystem 580. In some embodiments, program instructions that when executed implement disclosed techniques may be included/stored within system memory 520.

I/O interfaces 540 may be any of various types of interfaces configured to couple to and communicate with other devices, according to various embodiments. In one embodiment, I/O interface 540 is a bridge chip (e.g., Southbridge) from a front-side to one or more back-side buses. I/O interfaces 540 may be coupled to one or more I/O devices 550 via one or more corresponding buses or other interfaces. Examples of I/O devices 550 include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 500 is coupled to a network via a network interface device 550 (e.g., configured to communicate over Wifi, Bluetooth, Ethernet, etc.).

The present disclosure includes references to "an" "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y. 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of tasks or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

What is claimed is:

1. A method, comprising:
    storing, by a multi-tenant database system, a standard schema for a database object, wherein the standard schema is shared by multiple tenants;
    storing, by the multi-tenant database system, a tenant-specific schema for the database object, wherein the tenant-specific schema includes one or more tenant-specific custom elements for the database object; and
    checking, by the multi-tenant database system, tenant-specific custom elements for a predetermined pattern to enforce a naming scheme;
    automatically adding, by the multi-tenant database system, the predetermined pattern in response to the check determining that a tenant-specific custom element does not include the predetermined pattern, wherein the predetermined pattern is not included in object elements of the standard schema;
    detecting, by the multi-tenant database system, an update of the standard schema; and
    in response to the detecting, the multi-tenant database system automatically propagating the update to the tenant-specific schema, while the database remains available to accept tenant queries of a tenant corresponding to the tenant-specific schema, without taking the database offline for the update.

2. The method of claim 1, wherein the multi-tenant database system stores data for a tenant according to both the standard schema and the tenant-specific schema for the database object in a non-relational underlying storage format.

3. The method of claim 2, further comprising:
    processing change records from a change stream for the non-relational underlying storage format, wherein the detecting the update of the standard schema and the automatic propagation are based on a change record for the update in the change stream.

4. The method of claim 1, wherein the standard schema is stored using a top-level scope and the tenant-specific schema is stored in a tenant namespace scope.

5. The method of claim 4, further comprising:
    creating, by the multi-tenant database system, the tenant namespace scope and the top-level scope;
    configuring, by the multi-tenant database system, multi-tenancy settings for the top-level scope based on one or more commands received via a provisioning application programming interface (API);
    updating, by the multi-tenant database system, the tenant-specific schema based on one or more commands received via a metadata API; and
    updating, by the multi-tenant database system, a database object that conforms with the tenant-specific schema based on one or more commands received via a data API.

6. The method of claim 1, further comprising maintaining state information for the standard schema that supports at least the following states:
    a creating state;
    an active state;
    an updating state; and
    one or more states in which at least a portion of the standard schema is being propagated to multiple tenants.

7. The method of claim 6, further comprising maintaining state information for the tenant-specific schema that supports at least the following states:
    a creating state;
    an active state; and
    an updating state.

8. The method of claim 1, wherein the storing the tenant-specific schema includes storing, for different tenants, multiple different tenant-specific schemas associated with the standard schema.

9. The method of claim 1, further comprising:
in response to creation of a tenant-defined database object, automatically storing a tenant-specific schema for the tenant-defined database object.

10. A non-transitory computer-readable medium having computer instructions stored thereon that, when executed by a multi-tenant database system, cause operations comprising:
storing a standard schema for a database object, wherein the standard schema is shared by multiple tenants;
storing a tenant-specific schema for the database object, wherein the tenant-specific schema includes one or more tenant-specific custom elements for the database object; and
checking tenant-specific custom elements for a predetermined pattern to enforce a naming scheme;
automatically adding the predetermined pattern in response to the check determining that a tenant-specific custom element does not include a predetermined pattern, wherein the predetermined pattern is not included in object elements of the standard schema;
detecting an update of the standard schema; and
in response to the detecting, automatically propagating the update to the tenant-specific schema, while the database remains available to accept tenant queries of a tenant corresponding to the tenant-specific schema, without taking the database offline for the update.

11. The non-transitory computer-readable medium of claim 10, wherein the operations further comprise:
storing data for a tenant according to both the standard schema and the tenant-specific schema for the database object in a non-relational underlying storage format.

12. The non-transitory computer-readable medium of claim 10, wherein the operations further comprise:
asynchronously processing change records from a change stream, wherein the detecting the update of the standard schema and automatic propagation is based on a change record for the update in the change stream.

13. The non-transitory computer-readable medium of claim 10, wherein the standard schema is stored using a top-level scope and the tenant-specific schema is stored in a tenant namespace scope, the operations further comprising:
creating the tenant namespace scope and the top-level scope;
configuring multitenancy settings for the top-level scope based on one or more commands received via a provisioning application programming interface (API);
updating the tenant-specific schema based on one or more commands received via a metadata API; and
updating a database object that conforms with the tenant-specific schema based on one or more commands received via a data API.

14. The non-transitory computer-readable medium of claim 10, wherein the operations further comprise:
maintaining state information for the standard schema that supports at least the following states:
a creating state;
an active state;
an updating state; and
one or more states in which at least a portion of the standard schema is being propagated to multiple tenants; and
maintaining state information for the tenant-specific schema that supports at least the following states:
a creating state;
an active state; and
an updating state.

15. The non-transitory computer-readable medium of claim 10, wherein the storing the tenant-specific schema includes storing, for different tenants, multiple different tenant-specific schemas associated with the standard schema.

16. The non-transitory computer-readable medium of claim 10, wherein the operations further comprise:
in response to creation of a tenant-defined database object, automatically storing a tenant-specific schema for the tenant-defined database object.

17. A system comprising:
one or more processors; and
one or more storage elements having computer instructions stored thereon that are capable of being executed by the one or more processors to:
store a standard schema for a database object, wherein the standard schema is shared by multiple tenants;
store a tenant-specific schema for the database object, wherein the tenant-specific schema includes one or more tenant-specific custom elements for the database object;
check tenant-specific custom elements for a predetermined pattern to enforce a naming scheme;
automatically add the predetermined pattern in response to the check determining that a tenant-specific custom element does not include a predetermined pattern, wherein the predetermined pattern is not included in object elements of the standard schema;
detect an update of the standard schema; and
in response to the detection, automatically propagate the update to the tenant-specific schema, while the database remains available to accept tenant queries of a tenant corresponding to the tenant-specific schema, without taking the database offline for the update.

18. The system of claim 17, wherein the system is configured to store data for a tenant according to both the standard schema and the tenant-specific schema for the database object in a non-relational underlying storage format.

19. The system of claim 17, wherein the instructions are further capable of being executed to:
asynchronously process change records from a change stream, wherein the detection of the update of the standard schema and automatic propagation is based on a change record for the update in the change stream.

20. The system of claim 17, wherein the standard schema is stored using a top-level scope and the tenant-specific schema is stored in a tenant namespace scope, wherein the instructions are further capable of being executed to:
create the tenant namespace scope and the top-level scope;
configure multitenancy settings for the top-level scope based on one or more commands received via a provisioning application programming interface (API);
update the tenant-specific schema based on one or more commands received via a metadata API; and
update a database object that conforms with the tenant-specific schema based on one or more commands received via a data API.

* * * * *